(12) United States Patent
Na et al.

(10) Patent No.: US 8,685,546 B2
(45) Date of Patent: Apr. 1, 2014

(54) RECORDING DEVICE

(75) Inventors: Kyoung-won Na, Seoul (KR);
Myung-bok Lee, Suwon-si (KR);
Sang-chul Sul, Suwon-si (KR);
Jin-seung Sohn, Seoul (KR)

(73) Assignee: Seagate Technology LLC, Cupertino, CA (US)

( * ) Notice: Subject to any disclaimer, the term of this patent is extended or adjusted under 35 U.S.C. 154(b) by 398 days.

(21) Appl. No.: 12/472,441

(22) Filed: May 27, 2009

(65) Prior Publication Data
US 2009/0296280 A1    Dec. 3, 2009

(30) Foreign Application Priority Data

May 27, 2008    (KR) .................. 10-2008-0049288

(51) Int. Cl.
*G11B 5/86*    (2006.01)
(52) U.S. Cl.
USPC ............................................ 428/826; 360/16
(58) Field of Classification Search
None
See application file for complete search history.

(56) References Cited

U.S. PATENT DOCUMENTS

| | | | |
|---|---|---|---|
| 7,674,535 B2* | 3/2010 | Ichikawa et al. | 428/826 |
| 8,085,648 B2* | 12/2011 | Na et al. | 369/275.3 |
| 2002/0048106 A1* | 4/2002 | Miyata et al. | 360/17 |
| 2002/0081018 A1* | 6/2002 | Hamano et al. | 382/151 |
| 2003/0011912 A1* | 1/2003 | Nishikawa et al. | 360/17 |
| 2004/0233559 A1* | 11/2004 | Nishikawa | 360/17 |

FOREIGN PATENT DOCUMENTS

| | | |
|---|---|---|
| JP | 2002-279617 | 9/2002 |
| JP | 2003-157520 | 5/2003 |

OTHER PUBLICATIONS

Applicant-provided Office Action issued for related Japanese Patent Application No. 2009-126616, dated Feb. 19, 2013, and its English translation by Google Translate.

* cited by examiner

*Primary Examiner* — Holly Rickman

(57) ABSTRACT

Provided is a recording medium suitable for use in magnetic transfer of a servo pattern onto a magnetic recording medium. The recording medium includes a substrate including a plurality of servo regions and a plurality of data regions, and a magnetic layer formed on each of the servo regions and patterned in the shape of a servo pattern to be patterned on a magnetic recording medium, wherein the servo regions protrude relative to the data regions.

18 Claims, 4 Drawing Sheets

RECORDING DEVICE

CROSS-REFERENCE TO RELATED PATENT APPLICATION

This application claims priority from Korean Patent Application No. 10-2008-0049288, filed on May 27, 2008, in the Korean Intellectual Property Office, the disclosure of which is incorporated herein in its entirety by reference.

BACKGROUND OF THE INVENTION

1. Field of the Invention

The present invention relates to magnetic recording technology, and more particularly, to a master recording medium for use in magnetic transfer of a servo pattern containing servo information onto a magnetic recording medium.

2. Description of the Related Art

Hard disk drives (HDDs) using a magnetic recording medium have high storage capacity and high speed access. As a result, HDDs have attracted a great deal of attention as data storage devices for various digital devices as well as computer systems. Recently, due to the wide use of information systems, the amount of information exchanged over various networks has increased enormously. Thus, HDDs of increasingly higher densities need to be developed.

In order to drive an HDD, servo information, which is required to correctly position a magnetic head on a desired location of a magnetic recording medium, needs to be pre-written in a magnetic recording medium. Servo information is written as a servo pattern formed by magnetizing a recording layer of the magnetic recording medium as a predetermined pattern. The servo pattern is formed by magnetic transfer of a master recording medium on which a shape corresponding to the servo pattern is formed.

As the density of HDDs increase, a line width of a servo pattern needs to be reduced, and thus a master recording medium that can be used to efficiently magnetically transfer a servo pattern suitable for high density recording is needed.

SUMMARY OF THE INVENTION

The present invention provides a master recording medium having improved magnetic transfer performance in which a servo pattern having a minute line pattern can be magnetically transferred onto a magnetic recording medium.

According to an aspect of the present invention, there is provided a master recording medium comprising a substrate including a plurality of servo regions and a plurality of data regions; and a magnetic layer formed on each of the servo regions and patterned in the shape of a servo pattern to be formed on a magnetic recording medium, wherein the servo regions protrude relative to the data region.

The master recording medium may further comprise a buffer layer formed between the servo regions and the magnetic layer.

The buffer layer may be formed of a material that is softer than a material used to form the magnetic layer.

The magnetic layer may be formed by nano imprinting.

The servo pattern may be formed in the magnetic layer, or the magnetic layer may fill the engraved pattern of the polymer layer.

The magnetic layer may be formed along a surface of the polymer layer on which the servo pattern is embossed.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

Figure 1:
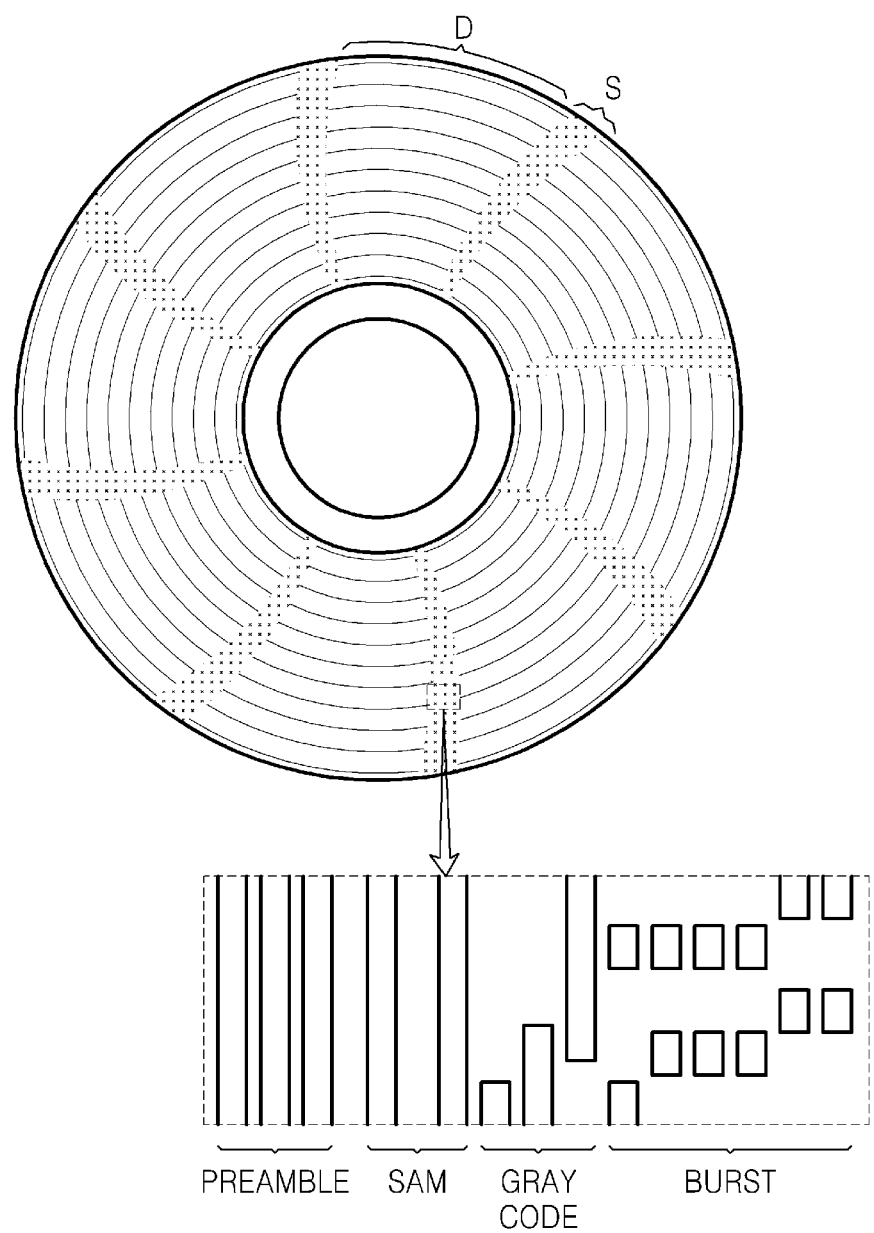
FIG. 1 illustrates a configuration of the regions of a general magnetic recording medium.

Hereinafter, exemplary embodiments of the present invention will be described in detail with reference to the attached drawings. In the drawings, the thicknesses of layers and regions are exaggerated for clarity. The same reference numerals in the drawings denote the same element.

Prior to describing a master recording medium and method of manufacturing the master recording medium according to the present invention, a method of forming a servo pattern on a magnetic recording medium used in an HDD will be described with reference to FIGS. 1 and 2.

FIG. 1 illustrates a configuration of the regions of a general magnetic recording medium. The magnetic recording medium has a disk shape so that information can be recorded along a plurality of circular tracks. The magnetic recording medium is divided into a data region D on which data is recorded and a servo region S on which servo information regarding the tracks is recorded. Servo patterns magnetized in a predetermined pattern are formed on the servo region S. For example, the servo pattern may include a preamble providing synchronization, a servo address mark (SAM) signaling the beginning of a servo sector and then providing synchronization for reading a gray code subsequent to the SAM, a gray code providing track identification (ID), and a burst providing information for calculating a position error signal required for following the tracks. However, the shapes of the servo pattern illustrated in FIG. 1 are only examples, and various changes in form and detail can be made according to the tracks. When data is reproduced from the magnetic recording medium, the HDD seeks and follows the tracks by reading the servo information from the servo pattern of the servo region S.

Figure 2:
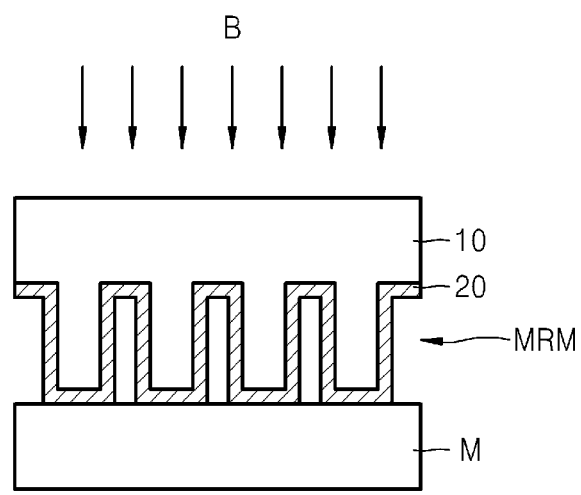
FIG. 2 illustrates a method of magnetically transferring a servo pattern onto a magnetic recording medium.

FIG. 2 illustrates a method of forming the servo pattern illustrated in FIG. 1 on a magnetic recording medium M. In order to form the servo pattern on the magnetic recording medium M, a master recording medium (MRM), which can magnetically transfer a shape of the servo pattern, is used. For example, the master recording medium MRM includes a substrate 10 on which the servo pattern is embossed and a magnetic layer 20 formed of CoFe and disposed along a surface of the substrate on which the servo pattern is embossed.

The master recording medium MRM is positioned on the magnetic recording medium M on which the servo pattern is to be formed, and then an external magnetic field B is applied. Due to the external magnetic field B, the magnetic layer 20 of the master recording medium MRM and a recording layer of an upper portion of the magnetic recording medium M are magnetized. Once the magnetic field is applied, the pattern of magnetization on the upper portion of the magnetic recording medium M is the same as the pattern embossed on the master recording medium MRM.

When the servo pattern is transferred using the above-described method, the magnetic layer 20 of the master recording medium MRM needs to be in contact with the surface of the magnetic recording medium M. However, the magnetic layer 20 of the master recording medium MRM has the same hardness characteristics as the magnetic recording medium M, and thus it is not easy to bring the magnetic layer 20 of the master recording medium MRM into close contact with the magnetic recording medium M. When a pressure is applied in order to achieve close contact between the magnetic layer 20 and the magnetic recording medium M, one or both of the master recording medium MRM and the magnetic recording medium M may be damaged.

To overcome this problem, the present invention provides a master recording medium MRM having a region configuration that can achieve close contact between the master recording medium MRM and the magnetic recording medium M and can improve magnetic transfer performance.

Figure 3:
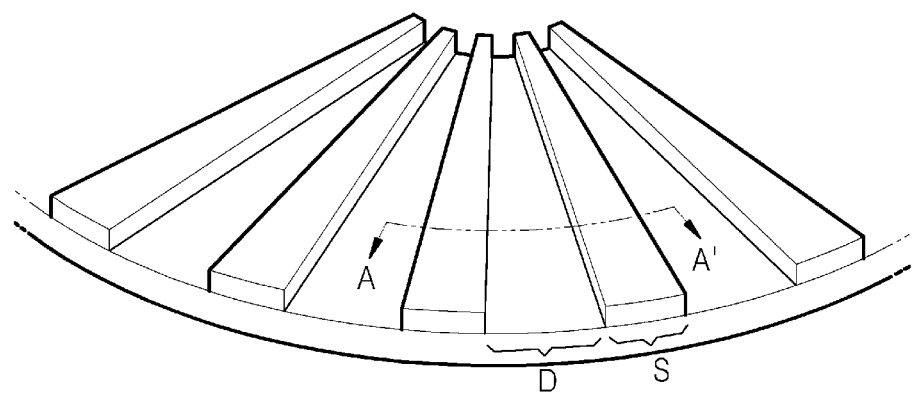
FIG. 3 illustrates a configuration of the regions of a master recording medium according to an exemplary embodiment of the present invention.

FIG. 3 illustrates a region configuration of a master recording medium according to an exemplary embodiment of the present invention. The master recording medium according the present exemplary embodiment includes a servo region S and a data region D. The servo region S includes a magnetic layer that is patterned in order to magnetically transfer a shape of a servo pattern to be formed on the magnetic recording medium, and is formed to protrude higher than the data region D. In particular, a top surface of the servo region S is spaced from a top surface of the data region D in an axial direction.

The shape and dimensions of the servo region and the data region D are illustrated in FIG. 3 in a manner to emphasize the protruding of the servo region S, and various changes in form and detail can be made. For example, referring to FIG. 3, on the master recording medium according to the present invention, the servo region S extends in a radial direction of the master recording medium and a plurality of servo regions S are spaced apart from each other in a circumferential direction of the master recording medium so as to protrude outward in the axial direction relative to the data region D. However, the servo regions S may be spaced apart from each other in the radial direction as well as in the circumferential direction. In addition, a magnetic layer pattern corresponding to a single servo pattern as a basic unit or a plurality of magnetic layer patterns corresponding to a plurality of servo patterns may be formed on the servo region S that is a single protruding unit.

When the servo pattern is magnetically transferred onto the magnetic recording medium M by the method illustrated in FIG. 2, the uneven structure of the master recording medium MRM, in which the servo region S protrudes relative to the data region D, facilitates contact between the servo region S and the magnetic recording medium M. In addition, if necessary, even if an appropriate pressure is applied using vacuum induction, since only the servo regions S are in contact with the magnetic recording medium M, i.e., the data regions are not in contact, damage to the magnetic recording medium M and the master recording medium MRM can be prevented. In addition, in order to protrude the servo region S, a buffer layer, which is formed of a material having advantageous properties in terms of contact induction or magnetic transfer induction, may be provided at the servo region S, thereby improving magnetic transfer performance.

FIGS. 4 through 9 are cross-sectional views of master recording media 101 through 106, which shows various exemplary embodiments of the master recording medium MRM taken along a line A-A' illustrated in FIG. 3. Descriptions of the master recording media 101 through 106 will be given as follows.

Figure 4:
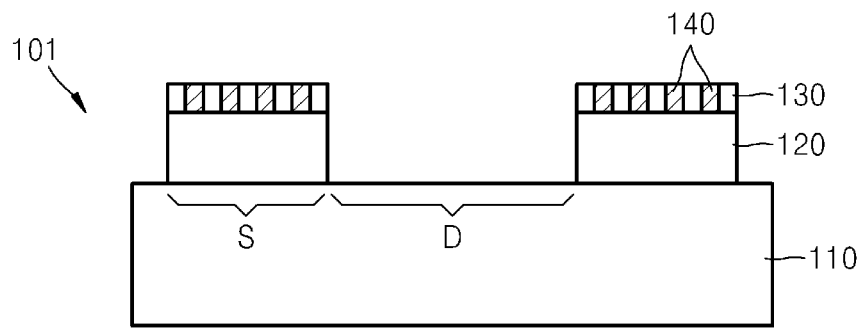
FIGS. 4 through 9 are detailed cross-sectional views of master recording media, which show various exemplary embodiments of the master recording medium taken along a line A-A' of FIG. 3.

Referring to FIG. 4, the master recording medium 101 includes a substrate 110 including a plurality of regions classified into a servo region S and a data region D, and a magnetic layer 140 formed on the servo region S and patterned so as to magnetically transfer a shape of a servo pattern onto a magnetic recording medium. The master recording medium 101 has a portion which protrudes corresponding to the servo region S. In FIG. 4, a buffer layer 120 is formed on the servo region S of the substrate 110. The magnetic layer 140 that is patterned is formed on the buffer layer 120. A polymer layer 130 is formed on the buffer layer 120 and has engraved servo patterns that are filled with the magnetic layer 140. For example, the engraved servo patterns may be formed by smoothly coating the polymer layer 130 on the buffer layer 120, engraving the polymer layer 130 by nano imprinting using a nano stamp on which a servo pattern is embossed, and then forming the magnetic layer 140 by plating or deposition. When nano imprinting is used, since the line pattern of the magnetic layer 140 can be minutely embodied, the master recording medium 101 is suitable for magnetically transferring the servo pattern of a magnetic recording medium for high recording density.

The substrate 110 may be formed of a magnetic material such as a Ni alloy, a Co alloy or a Fe alloy. When the substrate 110 is formed of a magnetic material, it is easy to perform magnetic transfer.

The buffer layer 120 may be formed of a softer material than a material of the magnetic recording medium M or the magnetic layer 140. In this case, mechanical shock can be prevented. In addition, when the master recording medium 101 is used to transfer a servo pattern, as illustrated in FIG. 2, contact between the master recording medium 101 and the magnetic recording medium M can be increased. The buffer layer 120 may be formed of, for example, resin, polymer or rubber. In addition, the buffer layer 120 may be formed of a magnetic material. In this case, the pattern of the magnetic layer 140 can be easily magnetically transferred. The magnetic layer 140 may be formed of, for example, CoFe, CoNiFe or NiFe.

Figure 5:
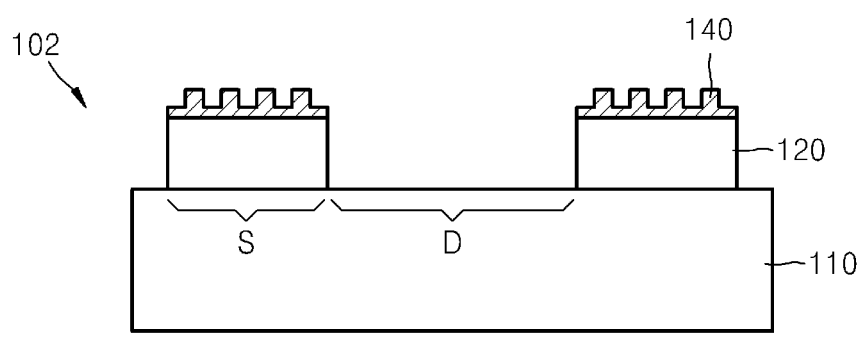

The master recording medium 102 of FIG. 5 differs from the master recording medium 101 of FIG. 4 in the pattern of the magnetic layer 140. In FIG. 5, a servo pattern is patterned directly on the magnetic layer 140. For example, the patterned servo pattern may be formed by forming a polymer replica, on which a shape of the servo pattern is engraved, using nano imprinting which uses a nano stamp on which the shape of the servo pattern is embossed. After the stamp is used on the magnetic material to form an engraved pattern, the pattern is filled with a magnetic material, and then the polymer replica is peeled off and separated from the magnetic material.

Figure 6:
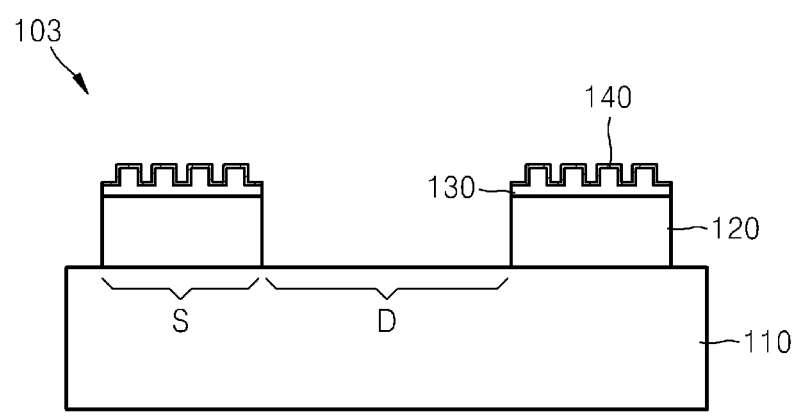

In the master recording medium 103 of FIG. 6, the magnetic layer 140 is formed along a surface of the polymer layer 130 which is formed to take the shape of a servo pattern. For example, the servo pattern may be formed by coating the polymer layer 130 on the buffer layer 120, forming the shape of the servo pattern on the polymer layer 130 by using nano imprinting, and then depositing a magnetic material along the surface of the polymer layer 130.

In the above embodiments of the present invention, specific shapes of the pattern of the magnetic layer 140 formed on the servo region S have been described. However, the pattern of the magnetic layer 140 has only to be a pattern for magnetically transferring the servo pattern on a magnetic recording medium. The detailed shape of the pattern of the magnetic layer 140 may be changed according to a process of forming the pattern as a minute line pattern on the magnetic layer 140 when a master recording medium is manufactured.

In addition, the buffer layer 120 has been described as being formed of a material suitable for providing a characteristic feature having improved magnetic transfer performance. For example, the buffer layer 120 may be formed of the same material as the substrate 110. In this case, the buffer layer 120 and the substrate 110 may be integrally formed.

Figure 7:
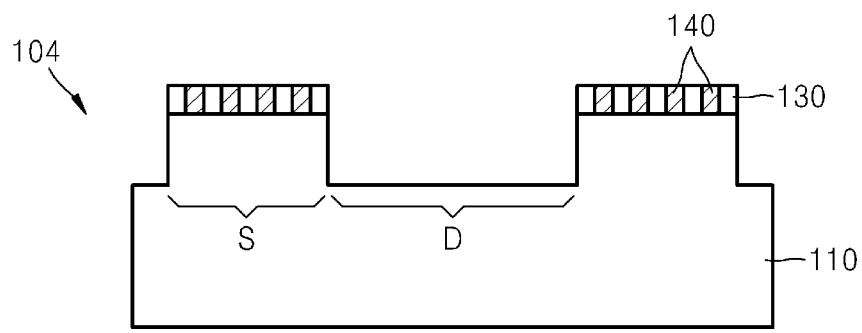
Figure 8:
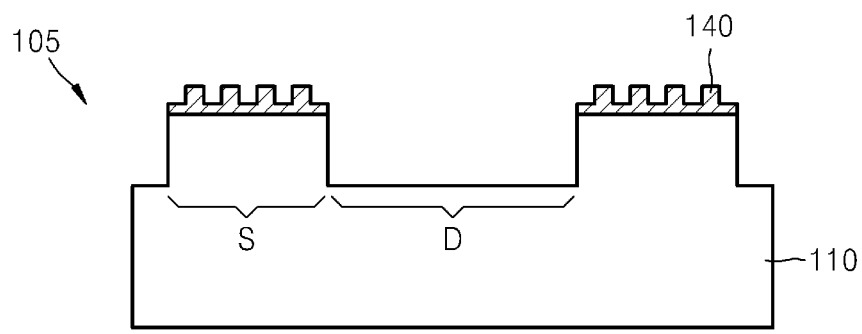
Figure 9:
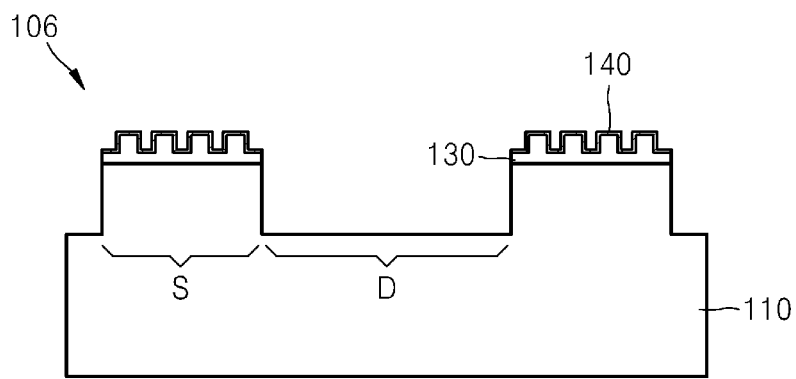

Master recording media 104 through 106 of FIGS. 7 through 9 differ from the master recording media 101 through 103 of FIGS. 4 through 6 in that a substrate 110 and a buffer layer 120 are integrally formed. That is, the master recording media 104 through 106 has a structure in which a data region D of the substrate 110 is formed to be recessed and the servo region S is formed to protrude. For example, such a structure may be formed by etching using an etching mask having a shape corresponding to a shape of the servo region S. In addition, when the substrate 110 is formed of a magnetic material, magnetic transfer can be efficiently performed.

According to the above exemplary embodiments of the present invention, each of the master recording media 101 through 106 can be used as the master recording medium MRM employed in a magnetic transfer method, described with reference to FIG. 2, and thus a servo pattern containing servo information can be magnetically transferred onto a magnetic recording medium. By having only a servo region protruding, damage to the master recording medium or the magnetic recording medium, which is a transfer target, can be prevented while improving contact between the servo region of the master recording medium and the magnetic recording medium required during magnetic transfer. In addition, by using a functional buffer layer, efficient magnetic transfer can be performed.

While the present invention has been particularly shown and described with reference to exemplary embodiments thereof, it will be understood by one of ordinary skill in the art that various changes in form and details may be made therein without departing from the spirit and scope of the present invention as defined by the following claims.

What is claimed is:

1. A master recording device comprising:
   a magnetic substrate including a plurality of servo regions and a plurality of data regions;
   a patterned magnetic layer formed on each of the servo regions and at least one magnetic layer pattern formed on each of the servo regions in the shape of at least one servo pattern to be formed on a magnetic recording device; and
   a buffer layer formed underneath the magnetic layer to protrude each of the servo regions;
   wherein:
   the servo regions protrude relative to the data regions;
   the servo pattern is spaced from a top surface of the data regions in an axial direction; and
   the buffer layer is formed of a magnetic material.

2. The master recording device of claim 1, wherein the buffer layer is formed of any one of resin, polymer and rubber.

3. The master recording device of claim 1, wherein the data regions of the substrate are recessed relative to the servo region.

4. The master recording device of claim 1, Wherein the magnetic layer is formed of any one material of CoFe, CoNiFe and NiFe.

5. The master recording device of claim 1, wherein the magnetic layer is formed by nano imprinting.

6. The master recording device of claim 1, wherein the shape of the servo pattern is embossed in the magnetic layer.

7. The master recording device of claim 1, further comprising a polymer layer formed on each of the servo regions and having an engraved pattern corresponding to a shape of the servo pattern, wherein the magnetic layer fills the engraved pattern.

8. The master recording device of claim 1, further comprising a polymer layer formed on each of the servo regions to take the shape of the servo pattern embossed on the polymer layer, wherein the magnetic layer is formed on a surface of the polymer layer.

9. A master recording device comprising:
   a substrate including a plurality of servo regions and a plurality of data regions;
   a patterned magnetic layer formed on each of the servo regions and at least one magnetic layer pattern formed on each of the servo regions in the shape of at least one servo pattern to be formed on a magnetic recording device; and
   a buffer layer formed between a surface of the substrate and the magnetic layer adapted for each of the servo regions to protrude relative to the data regions, wherein the buffer layer comprises a magnetic material.

10. A master recording device comprising:
    a substrate including a plurality of servo regions and a plurality of data regions;
    a patterned magnetic layer formed on each of the servo regions and at least one magnetic layer pattern formed on each of the servo regions in the shape of at least one servo pattern to be formed on a magnetic recording device; and
    a buffer layer formed between a surface of the substrate and the magnetic layer adapted for each of the servo regions to protrude relative to the data regions, wherein the buffer layer comprises a different material than the substrate.

11. The master recording device of claim 9, wherein the buffer layer comprises the same material as the substrate.

12. The master recording device of claim 9, wherein the buffer layer is formed of any one of resin, polymer and rubber.

13. The master recording device of claim 9, wherein the servo pattern is spaced from a top surface of the data regions in an axial direction.

14. The master recording device of claim 9, wherein the magnetic layer is formed of any one material of CoFe, CoNiFe and NiFe.

15. The master recording device of claim 9, wherein the shape of the servo pattern is embossed in the magnetic layer.

16. The master recording device of claim 9, further comprising a polymer layer formed on each of the servo regions and having an engraved pattern corresponding to a shape of the servo pattern, wherein the magnetic layer fills the engraved pattern.

17. The master recording device of claim 9, further comprising a polymer layer formed on each of the servo regions to take the shape of the servo pattern embossed on the polymer layer, wherein the magnetic layer is formed on a surface of the polymer layer.

18. The master recording device of claim 9, wherein the buffer layer is softer than a material used to form the magnetic layer.

* * * * *